Oct. 26, 1965    L. A. OLLIVIER ETAL    3,213,686
MOVING ELEMENT POSITION INDICATOR
Filed Jan. 16, 1961    4 Sheets-Sheet 1

INVENTORS
LOUIS A. OLLIVIER &
JAMES B. SKITT, Jr.
BY
ATTORNEYS

INVENTORS
LOUIS A. OLLIVIER &
JAMES B. SKITT, Jr.

ATTORNEYS

Oct. 26, 1965     L. A. OLLIVIER ETAL     3,213,686
MOVING ELEMENT POSITION INDICATOR
Filed Jan. 16, 1961     4 Sheets-Sheet 3

INVENTORS
LOUIS A. OLLIVIER &
JAMES B. SKITT, Jr.
BY

ATTORNEYS

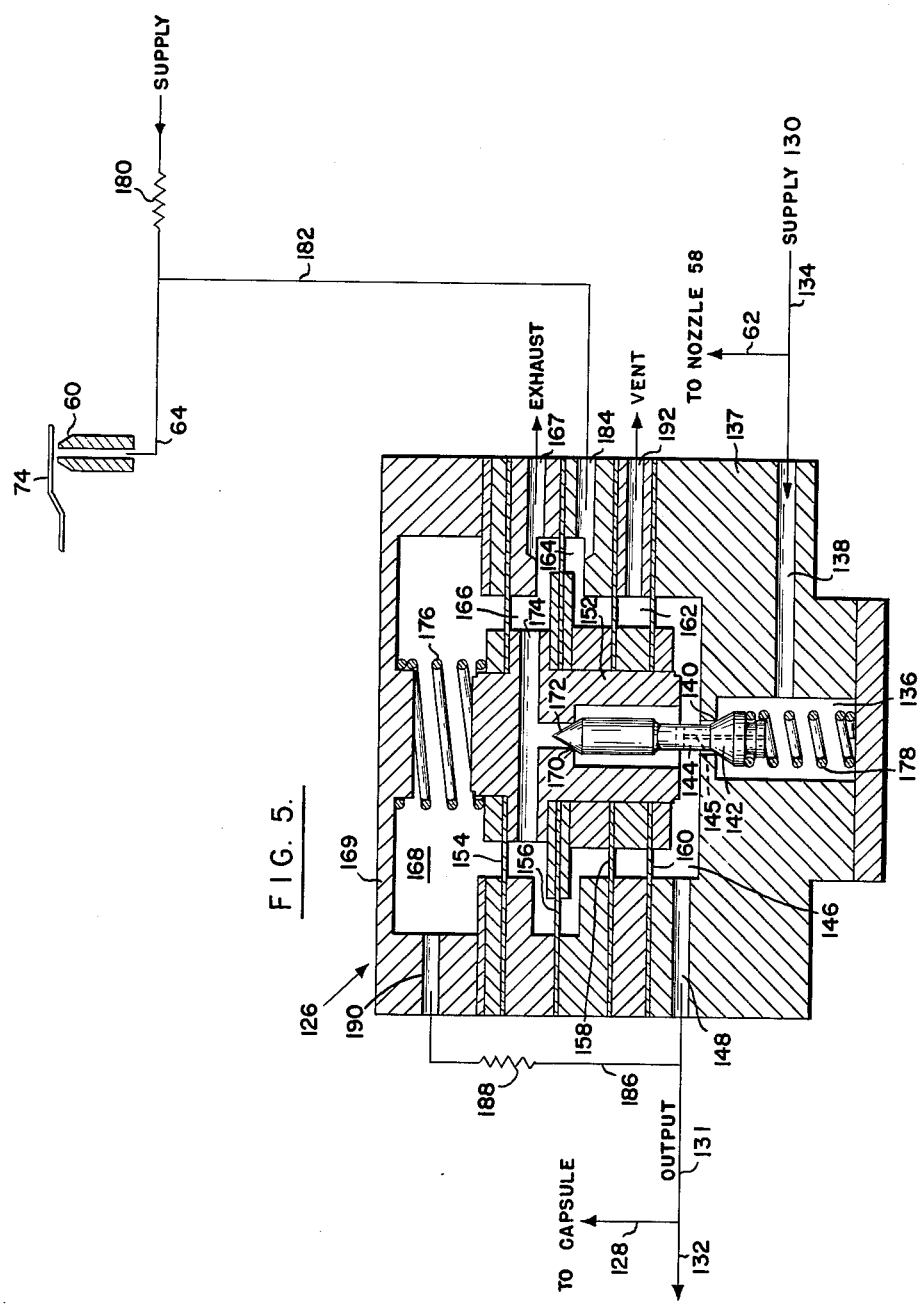

United States Patent Office 3,213,686
Patented Oct. 26, 1965

3,213,686
MOVING ELEMENT POSITION INDICATOR
Louis A. Ollivier, Huntingdon Valley, and James B.
Skitt, Jr., Chalfont, Pa., assignors to Fischer &
Porter Company, Warminster, Pa., a corporation
of Pennsylvania
Filed Jan. 16, 1961, Ser. No. 82,984
14 Claims. (Cl. 73—207)

This invention relates to measuring apparatus and has particular reference to apparatus in which an indicator is variably positioned magnetically in accordance with values of a variable giving rise to a displacement and/or which provides an output signal in response to a movement.

While of broader scope, the invention will be described with particular reference to a flowmeter which gives rise to certain special problems solved in accordance with the invention.

In the case of a flowmeter of the variable flow area type a member (float) occupies definite positions as a function of flow. Since the fluid must generally be isolated from its surroundings, it is not satisfactory to carry its movements mechanically to indicating or signal-producing devices, because of frictional retardations resulting from the uses of stuffing boxes, or the like, and it has been found desirable to transmit motion through the use of a magnet or magnets carried by the movable member and acting through the wall of a tube to effect mechanical positioning of a follower, which latter either serves to provide indications or gives rise to outputs which may be used for measuring or control purposes. One arrangement used for this purpose involves the provision of a ribbon of magnetic material twisted to provide a helical edge, the ribbon being mounted about an axis parallel to the path of the magnet or magnets so that the ribbon is constantly positioned with at least one helical edge taking a position of minimum spacing from the magnet, thus giving rise to a rotary motion of the ribbon as the member moves.

The arrangement thus provided is unsatisfactory in that its output indications are generally non-linear. A twisted ribbon such as that just mentioned, secured at its ends, gives rise to a helix of its edges having uniform pitch; or, if not uniform, at least independently uncontrollable in the sense that the structure of the ribbon and its mounting will define the geometrical shape of its edge. Considering a variable area flowmeter, the position of its float is not ordinarily linear with respect to flow, and if the twisted ribbon type of magnetic follower is used to provide a flow indication, the resulting scale against which readings must be taken must be correspondingly non-linear and, in effect, specially tailored to the flowmeter characteristics and characteristics of the ribbon follower. Difficulties are also encountered in predetermining zero settings and range spread.

One of the objects of the present invention is to provide a novel follower arrangement avoiding the difficulties set forth above. Specifically, a follower is provided by means of an elongated element of magnetic material which is readily permanently deformable to a definite shape in such fashion as to compensate for non-linearity of other parts of the system; or, if such compensation is not desirable, it may be permanently shaped to secure a desirable, though non-linear, indication. Provision is also made for simple range and zero adjustments. The result is that given a standard scale a permanent adjustment may be readily made in each of a series of meters to secure proper indications.

A second aspect of the invention involves its applicability to an instrument providing an output signal, particularly of pneumatic type. It is known that such an output may be provided by having the rotary follower element carry a contoured vane controlling flow of air from one or more nozzles. In such an arrangement the vane during rotation intercepts a path of movement of the nozzle or nozzles, and by a feedback arrangement the nozzle or nozzles may be made to move so as to remain in alignment with the edge of the vane. Here again it will be evident that if a follower ribbon is used, non-uniformity between instruments would necessitate varying contours of the vane to secure definite relationships of output signals to the flows or other variables. Utilizing a vane arrangement, the present invention makes possible uniformity of the vanes because of the possibility of readily characterizing the magnetic follower element to provide the corrections necessary to secure predetermined functional relationship between an output and the quantity, such as flow, being measured.

Still another object of the invention has to do with an arrangement for causing a nozzle to follow a contoured element such as a vane. In certain arrangements heretofore used a vane for control of one or more nozzles has had to move very closely thereto in order to secure control of flow. In another arrangement, a nozzle had to be accurately aligned with a jet receiving opening, the edge of a vane being used to cut off the flow of the jet to the opening. Furthermore, utilized in such an arrangement was merely the impact of the jet produced from the nozzle in order to provide a stagnation pressure within the orifices. In accordance with the present invention an improved arrangement is used in which the usable pressure change is quite independent of a jet cooperating with a contoured vane. This independence is brought about by causing a jet of very small effective diameter to impinge on a movable member which provides a baffle for control of escape of air from an orifice. The pressure behind the orifice is highly sensitive to the position of such a baffle, and large signals of this pressure are produced giving rise to high sensitivity and accuracy arising from the relationship of the small diameter jet to the vane contour.

The foregoing objects of the invention, as well as others relating to advantageous mechanical details, attainment of stability, and other matters of adjustment and the like, will be more fully understood from the following description read in conjunction with the accompanying drawings, in which:

FIGURE 5 is a view showing in section and in part diagrammatically the pneumatic amplifying and signal-producing system.

Figure 1:
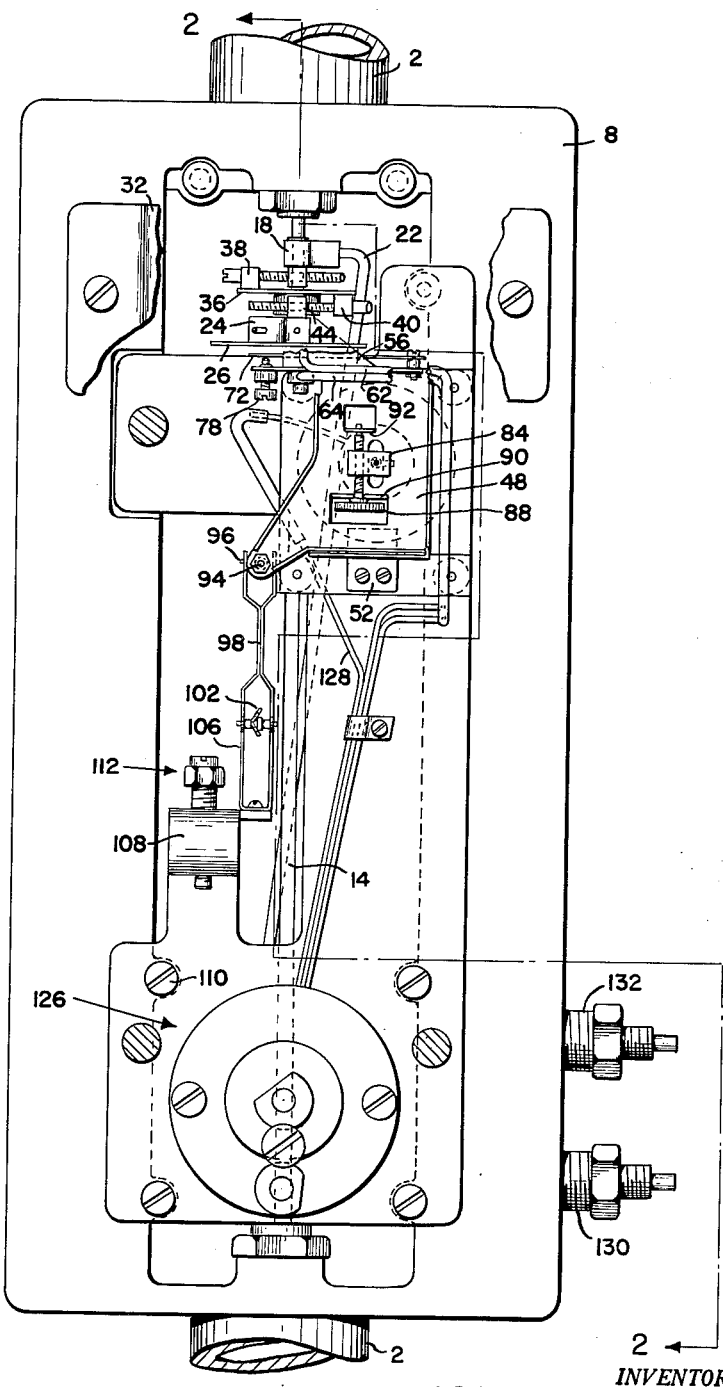
FIGURE 1 is a front elevation of a meter provided in accordance with the invention, various parts being broken away for clarity of showing.

A flowmeter tube is indicated at 2 and is of conventional variable area type embodying a float 4 which is positioned vertically in accordance with the upward flow through the tube in usual manner. The tube 2 may be of glass or may be of non-magnetic metal. This flowmeter may be of many conventional types and consequently its details need not be described. The float carries a magnet 6 which is used to effect positioning of a member external to the tube. As will be evident, either a single magnet or a system of magnets may be used.

The portion of the apparatus with which the invention is concerned comprises a frame 8 for supporting its active parts, the frame being arranged to be secured to the flowmeter tube by clamps such as 10 and 12.

A spindle 14 is mounted in parallelism with the tube by anti-friction bearings 15 and 16. At the lower end of the spindle there is secured a support 17, and at the upper end of the spindle there is releasably clamped for angular adjustment a support 18. Between these two supports there extends, secured in both of them, an elongated follower member 22 of high permeability magnetic iron. While this member 22 may be in the form of a rod or wire, it is advantageous to provide it by a tube of the permeable material. The reason for the latter is that its desirable characteristic is that it should be permanently deformable to a desired contour to fit the characteristics of the flowmeter arrangement which it follows. A soft iron is used, and while this can be chosen to have a weak spring action, a tube of similar material, when slightly deflected, will even more readily exceed its elastic limit so as to take an a permanent shape.

Adjustably clamped also to the upper portion of the spindle 14 is a support 24 which carries both a contoured vane 26 and a pointer arm 28, the latter being provided with an indicating pointer 30 moving adjacent to a scale 32 which indicates the angular position of the spindle 14 and which may be calibrated in terms of flow, percent of full scale of flow, or other suitable indications. To facilitate ease of adjustment, a collar 34 is fixedly clamped on the spindle 14 and carries a plate 36 on which are mounted posts 38 and 40 providing thrust bearings for adjustment screws which are respectively threaded into posts 42 and 44 carried by the supports 18 and 24, respectively. As will be readily evident, for fine adjustments of both of the supports, their clamping screws may be released to permit turning and then the adjusting screws may be manipulated to set the angular positions of the supports about the spindle. When final desired positions are achieved the supports may then be clamped fixedly to the spindle.

Figure 2:
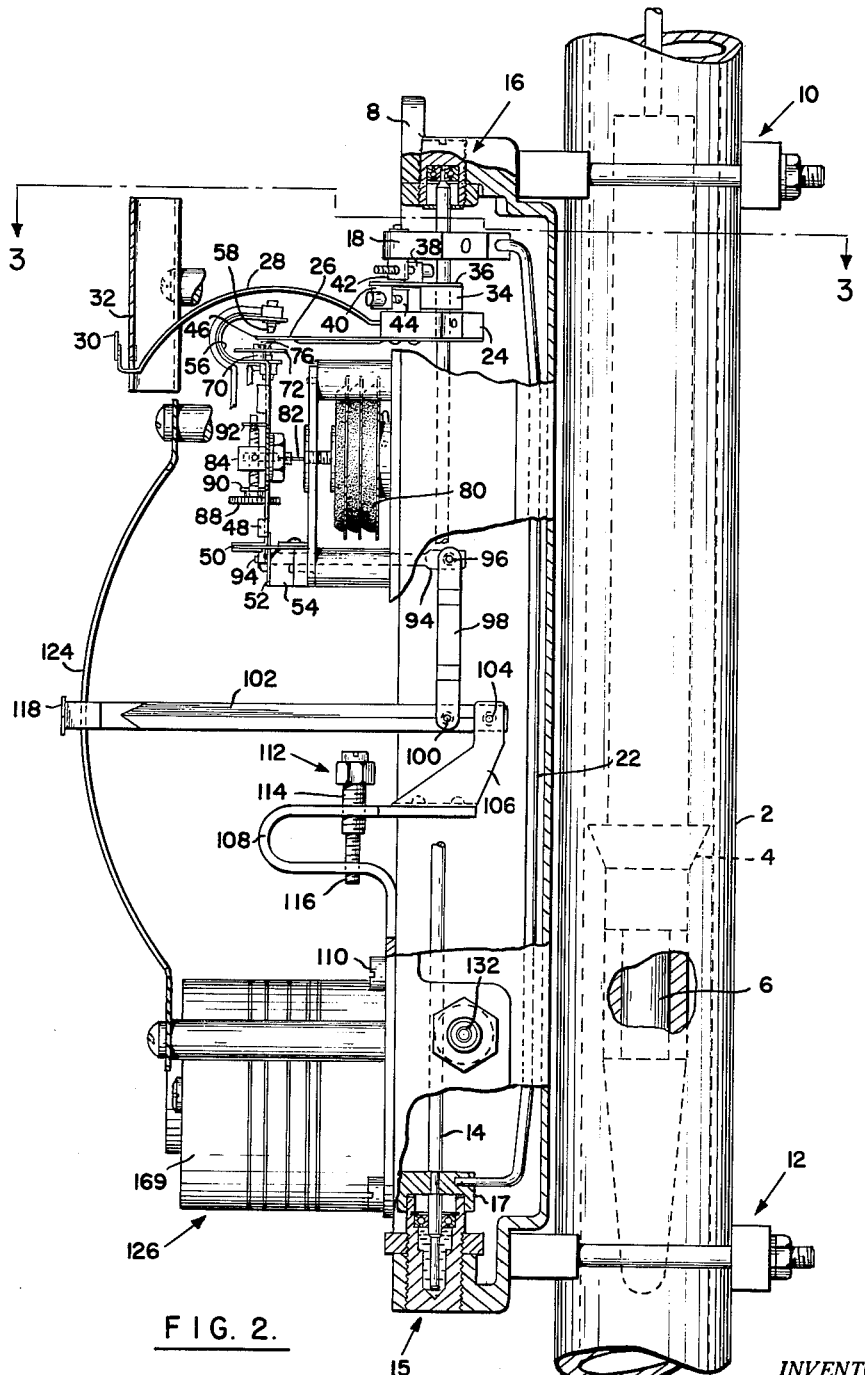
FIGURE 2 is a section taken on the broken surface, the trace of which is indicated at 2—2 in FIGURE 1.
Figure 3:
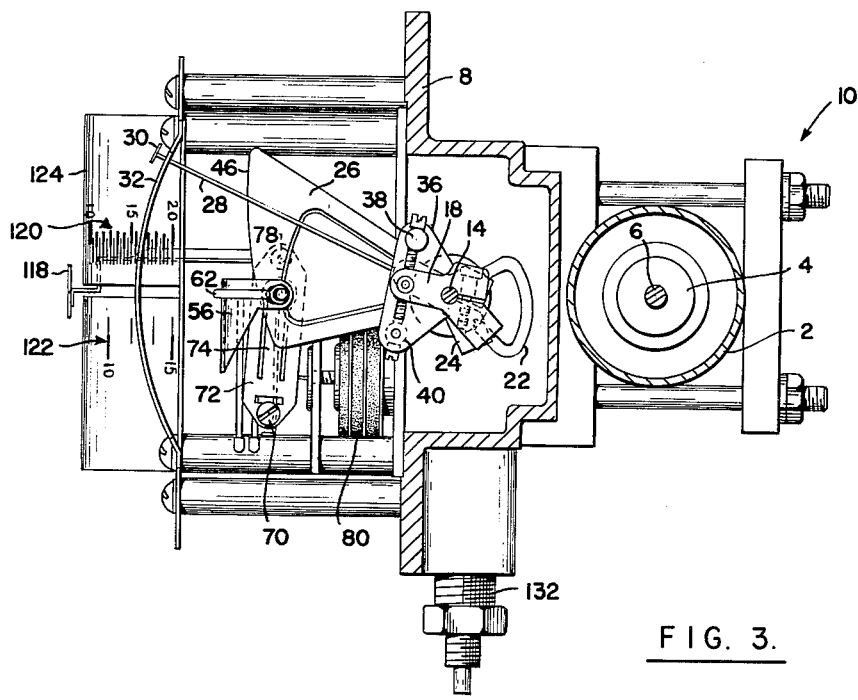
FIGURE 3 is a transverse section taken on the broken surface, the trace of which is indicated at 3—3 in FIGURE 2.

The purpose of the adjustments may now be described as follows:

As will be noted particularly from FIGURE 3, considered in conjunction with FIGURES 1 and 2, the follower member 22 occupies a helical (using that term in a broad sense) position about the spindle 14. When the float 4 is in its lowermost position its magnet will be at the level of the lower portion of the follower 22 which will cause the spindle assembly to move to a position in which this lower end of the follower has a minimum distance from the magnet. Similarly, when the float is in its uppermost position, from the standpoint of useful indications, the magnet will be at the level of the upper portion of the follower 22 with the result that this upper portion of the follower will have a minimum spacing from the magnet. What is desired is that the rotation of the spindle 14 resulting from these extreme positions of the float should have a definite angular extent (full range movement) and the adjustment of the support 18 may be effected to secure this condition, the adjustment being, then, a span or range adjustment. It will be noted that in general the adjustments of the angular relationship between the upper and lower ends of the follower 22 will be slight so that the bends at its upper ends will readily accommodate such adjustment by flexure.

After the foregoing adjustment is completed, the support 24 may be similarly adjusted so that at the extreme ends of the movement of the float the pointer 30 will be located at the extreme indications of the scale 32. This, then, is a zero adjustment. Simultaneously, the vane 26 is adjusted, this having a fixed relationship to the pointer setting its position with respect to the other parts of the apparatus hereafter described.

Still another adjustment is now made. Due to nonlinearity of the float positions, it may be found that for intermediate positions of the float between its extremes there is some inaccuracy or indication. Adjustments, which will ordinarily be of relatively small extent, may now be made by characterizing the follower 22 to provide proper indications by the pointer 30 throughout the range of float movement. This is accomplished by locating the float in various positions and then manually bending or distorting the follower 22 to secure a shape thereof which, for each particular instrument, will cause its indications to be correct throughout the scale. Of course, there will generally be required only adjustment to correct for a small number of float positions, smooth continuity of curvature of the follower taking care of interpolation between the points for which adjustment is made. By reason of the permanent distortions which maye be applied to the follower 22, the final result is a permanent shape thereof to correspond to the individual requirements of the particular flowmeter with which it is associated. In the event of tube replacement, if there then occurs a departure from accurate indications, one or more of the foregoing described adjustments may be remade.

As will be most clearly seen from FIGURE 3, the vane 26 has a contoured edge 46 which has the form of a spiral about the axis of the spindle 14. Because of the foregoing adjustments of the follower 22, this contour may be definitely fixed for a whole series of similar instruments or even, in fact, many instruments of varying ranges utilizing different tubes and floats so long as full range of float movement is the same. Cooperating with the edge 46 is a follower assembly which, during operation, maintains a definite relationship with such edge and in doing so gives rise to outputs. Since what will now be described is mechanical and may be accurately fixed, it will become evident that indications and outputs will be definitely related to angular positions of the spindle 14 of the vane.

A lever 48 formed of sheet metal with strengthening flanges is pivoted to a support 54 constituting part of the frame. In order to avoid friction the pivot is provided by a pair of spring members, one of which, 50, is horizontal, and the other of which 52, is vertical. These are fixedly secured to the support 54 and to the lever 48. The upper end 56 of the lever is formed into a C-shape. The upper arm of this supports a nozzle 58 having a very small diameter opening which may be of the order of 0.01 inch or less. A jet produced from this nozzle is, therefore, of quite small diameter. The position of the lower end of the nozzle is slightly above the plane of the vane 26 with which it has no critical clearance, the clearance being small but permitting free, non-contacting movement of the vane. Secured at the lower end of the C-portion 56 of the lever is a second nozzle or orifice 60 directed upwardly. Air is supplied to the respective nozzles through connections 62 and 64 as will be later described in greater detail. These connections include flexible tubing offering no substantial resistance to movement of the lever 48. The nozzles 58 and 60 are shown in alignment, but they need not be so as will immediately appear.

Clamped at 70 to the lever 48 is a spring lever 72 which has struck up from its central portion a tongue 74 which extends over the upper end of orifice 60. To the top of this tongue is secured a disc 76 providing a relatively extended area for impingement by the air jet from the nozzle 58. An adjusting abutment screw 78 is provided in the lever 48 underlying the free end of the spring lever 72. This spring lever is so formed as to spring downwardly to such extent that the tongue 74 would engage the upper end of the nozzle 60 providing a baffle substantially cutting off flow from the nozzle. For operation, the screw 78 is adjusted upwardly to move the lever 72 against its spring action and carry upwardly the baffle to a position of slight clearance with the nozzle. The baffle formed by the tongue 74 is, however, readily pressed downwardly toward or against the nozzle 60 by the impingement of the jet from nozzle 58 on the disc 76 unless the jet is interrupted by the vane 26, the position of which is indicated in construction lines in FIGURE 4. The local action which is involved will now be evident. Control of flow from the nozzle 60 is dependent upon the action of the jet issuing from nozzle 58 and is relatively independent of the volume of air from the jet which need only be sufficient to provide impact causing the baffle 74 to close, to a substantial degree, the orifice provided by nozzle 60. The presence or absence of interception of the jet by the vane 26 produces an on-off operation except in the very limited diameter of the jet where there is modulation of the jet and, therefore, of the flow through the nozzle 60. As will now be described, there is a follow-up action which, except for the modulation referred to, involves on-off action.

A capsule 80 of a type adapted to be expanded against its own collapsing spring action by pressure therein is connected by a stiff wire 82 to the lever 48, the connection being adjustable by the clamping of the forward end of wire 82 within a block 84 which is guided for sliding adjustment in a slot 86 in the lever 48, fine adjustment being provided by a screw 88 threaded through the block and journalled in ears 90 and 92 formed in the lever. The effective lever arm of action of the wire 82 is thus changed for range or span adjustment.

A post 94 is secured to the lever 48 in general alignment with its effective axis of rocking, and the inner end of this post is connected at pivot 96 with a link 98 which in turn is pivoted at 100 to a lever arm 102. An adjustable fulcrum for this lever is provided at 104 in the upper end of a clevis 106 carried by a U-shaped portion 108 of a spring plate secured to the frame at 110. A differential screw 112 having two portions 114 and 116 of different pitch has these portions threaded into the upper and lower arms of the portions 108 of the plate. By manipulation of the screw a fine adjustment of the fulcrum point 104 is provided, and this constitutes a zero adjustment for the position of the lever 102 which carries at its outer end a pointer 118 cooperating with scales 120 and 122 formed on an arcuate support 124. These scales may be in any suitable units such as flow, percentage of full range of flow measurement, output air pressure, or the like. The lever 102, in effect, magnifies the movements of the lever 48.

The reasons for the two pointers 30 and 118 and their respective scales may now be indicated. The pointer 30, as has been described, takes care of the setting of, and the reading of, the movements of the spindle 14 and of vane 26; that is, in other words, it indicates the conditions of the mechanical portion of the apparatus. If pneumatic transmission is not involved, this would represent a true reading of the flow in terms of rotation of the spindle 14. The invention contemplates the provision of a simplified mechanical instrument omitting the pneumatic transmitter. The pointer 118, on the other hand, indicates the action of the pneumatic transmitter, and in effect responds to the pressure in the capsule 80, which pressure is transmitted as will hereafter appear. When the pneumatic transmitting elements are used, the reading of the pointer 118 is the one of interest, and pointer 30 is used only for the setting of the apparatus and for the setting and checking of the pointer 118.

Figure 4:
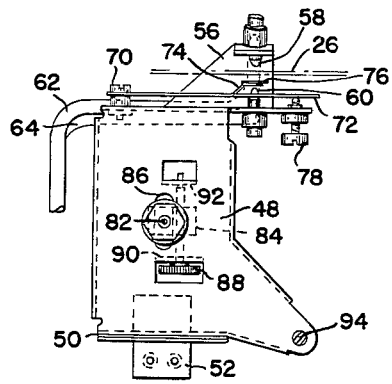
FIGURE 4 is an elevation showing certain details of the pneumatic detecting means.

The pneumatic system involves an amplifier and transmitting unit generally indicated at 126 and shown in detail in the diagram constituting FIGURE 5. In this diagram there will be recognized the connection 64 to the orifice 60 controlled by the baffle 74. Air flow through the nozzle 58 is supplied from a suitable source through connection 62 as previously indicated and as shown in FIGURE 4. Since this nozzle only supplies air to impinge on the baffle 74, it is not illustrated in FIGURE 5, there being no control of its air by the device therein shown. A connection 128 supplies air from the output of the amplifier 126 to the capsule 80.

130 and 132 (FIGURE 1) represent respectively the air supply and output connections. A connection 134 communicating with the supply connection 130 feeds air to a chamber 136 in a block 137 through a passage 138. The chamber 136 has an opening which provides a seat 140 for the conical portion 142 of the valve member 144, which may close off free communication between the chamber 136 and a chamber 146 located thereabove, which latter is provided with a passage 148 communicating with connection 131 which has branches 128 and 132, the former to the capsule, and the latter to a point to which a controlling or indicating pressure is to be transmitted. A bore 145 of small diameter (e.g., 0.02 inch) in valve 144 provides a restricted continuous communication between chambers 136 and 146. Cooperating with the valve member 144 is a movable seat assembly 152 which is clamped in the central portions of a series of diaphragms 154, 156, 158 and 160, the peripheral portions of which are clamped between a series of discs, including a cover 169, which discs and cover are clamped to the member 137 to provide a housing. The pairs of diaphragms provide between them chambers which are indicated at 162, 164 and 166. The lowermost diaphragm 160 forms a part of the top closure of chamber 146. The uppermost diaphragm 154 provides a chamber, forming a pneumatic capacity, below the cover 169. The member 152 has an opening at its central portion which provides a seat 170 for the upper conical end 172 of the valve member 144. Above this seat 170 the opening communicates at 174 with the interior of the chamber 166. The chamber 166 is vented to atmosphere through the opening 167.

A spring 176 within the chamber 168 urges the assembly 152 downwardly, while a spring 178 urges the valve member 144 upwardly as viewed in FIGURE 5.

Between the supply and nozzle 60 there is provided a pneumatic resistance 180 in the form of a restricted passage, and between this resistance and the nozzle 60 a connection 182 runs to the chamber 164 through the passage 184.

The chamber 146 is connected through passage 148 also to a connection 186 which includes a pneumatic resistance 188 and which runs through passage 190 to the chamber 168.

A vent 192 connects the chamber 162 to the atmosphere, and this vent is provided merely to insure that the diaphragms 158 and 160 always have their net pressure drops across them in the same direction to avoid snap action of the assembly.

It will be noted that the area of the top of the assembly 152 exposed to the pressure in chamber 168 is slightly less than the area of the bottom of the same assembly exposed to the pressure in chamber 146.

While in the diagram constituting FIGURE 5 various connections are illustrated as external, it will be understood that various of these may be provided in the outer wall members of the amplifier assembly in accordance with usual practice. For example, the pneumatic resistances 180 and 188 may be so located.

The operation of the unit just described is basically conventional. The position of the baffle 74 with respect to the orifice 60 determines, by reason of the pressure drop through the resistance 180, the pressure applied through 182 to the chamber 164.

Disregarding, initially, the flow of air taking place through the restriction provided at 145, and assuming a state of equilibrium, if the pressure in chamber 164 increases, the assembly 152 will move upwardly in view of the differential effective areas at the top and bottom of this chamber as will be evident from the contours indicated in FIGURE 5. This action results in opening of the valve arrangement provided at 170, 172 with exhausting of air from the chamber 146 through chamber 166 and the exhaust or vent connection 167. As a result of the short transient actions thus occurring, equilibrium is again attained. The gain, that is, the change of output pressure divided by the input pressure, is small as is required for stability, and is algebraically negative. This instantaneous gain is basically represented by the ratio of the respective effective areas presented by the effective area of the assembly 152 presented to chamber 164 and by the bottom of the assembly presented to chamber 146, and may typically be of the order of 0.5.

The above reestablishment of equilibrium takes place so rapidly that flow of air from chamber 168 through resistance 188 may be assumed negligible. But assuming that after this the pressure in chamber 164 remains constant, the pressure in chamber 168 will eventually become equal to that in chamber 146 with the gain rising to an ultimate value which may typically be of the order of 20 determined basically by the ratio of the effective area of the assembly 152 presented to the chamber 164 to the difference of the effective areas presented by the bottom and the top of the assembly 152 to the respective chambers 146 and 168. In effect this involves a progressive increase of gain as a function of time providing high positioning accuracy of the nozzle 58 relative to the vane 26 in the modulation range. This accuracy is attaine with complete stability in a short interval so that the rapidity of response is high.

Reverse changes, of course, occur when the input pressure drops, the attainment of high gain then involving flow of air into chamber 168.

The purpose of the restricted passage 145 is to maintain valve 172 continuously slightly spaced from its seat 170 and thus the assembly 152 mechanically free during equilibrium and near-equilibrium conditions. By the bleeding of air through passage 145 the pressure in chamber 146 will always tend to rise and move the assembly 152 upwardly to move the seat 170 from the valve to vent the entering air from the supply. This, of course, does not affect the basic operation but insures repeatability of results. When the pressure in chamber 164 decreases, the valve 142 is moved downwardly from its seat 140 to open a passage for rapid flow of air from the supply into chamber 146.

The capsule 80 is of a type having its own strong spring action so that the position of connection 82 is primarily determined by the capsule itself, the spring action at the mounting of the lever 48 being of minor significance. The spring action is such that with maximum pressure in the capsule 80 the nozzle 58 will occupy a position beyond the outermost portion of the edge 46 of the vane 26. Considering the elements above described, the action will now be obvious. When the nozzle 58 is beyond the edge 46 of the vane 26, the pressure in connection 182 rises due to closure of the orifice 60 by the baffle 74 under the action of the jet. This increase in pressure decreases the output pressure in lines 128, 131, 132 and in the capsule 80, moving the lever 48 and the nozzle assembly toward the edge 46 of the vane. If the jet from the nozzle 58 is interrupted by the vane, a reverse action occurs. These movements are stabilized by the feedback arrangement previously described, so that at equilibrium the jet from the nozzle 58 is directed at the edge 46 of the vane. Because of the small diameter of the jet the modulation range is very slight with the result that, as the vane moves, its edge is very closely followed by the nozzle 58. The following action is both very accurate and fast. The differential screw 112 serves to provide zero adjustment by setting the position of the fulcrum 104. The pointer 118 accordingly indicates the flow (in whatever terms are desired) and serves as a check on the operation of the pneumatic means. Failure of the pneumatic means would result in a zero or full scale indication, the latter conditions indicating maloperation.

It will be evident that various changes in details of construction and operation may be provided without departing from the invention as defined in the following claims.

What is claimed is:

1. A device for detecting the position of an edge of an element comprising means providing an orifice, means providing gas flow through said orifice, a pivoted baffle, means for effecting movement of said baffle relative to said orifice to control flow of gas therethrough, the last mentioned means comprising a nozzle spaced from said baffle and mounted to directly impinge a gas jet against the baffle to produce by impact on the baffle movement thereof towards said orifice, means providing gas to said nozzle to produce said jet, said baffle being unrestrained in its movements except as the result of gas flows through said orifice and nozzle, the arrangement being such that the detection occurs by reason of movement of the edge into the path of free flow of the jet between said nozzle and said baffle to intercept said jet to render it ineffective to produce said baffle movement, and means responsive to flow of gas through said orifice.

2. In combination, means providing a magnet guided for movement along a predetermined path and positionable along said path in accordance with the value of a variable, a follower for said magnet, and means mounting said follower for movement in a direction mutually transverse both to the path of said magnet and to normals to said path, said follower comprising an elongated wire-like magnetic element of readily permanently distortable material, and said mounting means supporting said element with the major portions of said element free of and adjustable relatively to said mounting means to permit such permanent distortion and effecting presentation of successive portions of the elongated element to the magnet at approximately the same distance therefrom as the magnet moves, said wire-like element having its ends connected to said mounting means by means providing relative adjustments of said ends.

3. The combination of claim 2 in which said wire-like member is tubular.

4. The combination of claim 2 in which the means mounting said follower is a rotary spindle having its axis substantially parallel to the path of movement of the magnet and in which the follower extends helically about said spindle.

5. The combination of claim 4 in which said wire-like member is tubular.

6. In combination, means providing a magnet positionable along a predetermined path in accordance with the value of a variable, a follower for said magnet, and a rotary spindle mounting said follower for rotary movement in a direction transverse to the path of said magnet, said follower comprising an elongated wire-like magnetic element of readily permanently distortable material extending helically about said spindle, and means securing the ends of said element to said spindle, said securing means being relatively adjustable to provide changes of angular relationship between said ends.

7. In combination, means providing an orifice, means providing gas flow through said orifice, a baffle, means for effecting movement of said baffle relative to said orifice to control flow of gas therethrough, the last mentioned means comprising a nozzle, means providing gas to said nozzle to provide a jet producing by impact said baffle movement, and means providing an edge movable to intercept said jet to render it ineffective to produce said baffle movement, and means responsive to the control by said baffle of flow through said orifice to move said nozzle towards a position in which its jet is in alignment with said edge.

8. In combination, means providing an orifice, means providing gas flow through said orifice, a baffle, means for effecting movement of said baffle relative to said orifice to control flow of gas therethrough, the last mentioned means comprising a nozzle, means providing gas to said nozzle to provide a jet producing by impact said baffle movement, and means providing an edge movable to intercept said jet to render it ineffective to produce said baffle movement, and means responsive to pressure before the orifice produced by the control by said baffle of flow through said orifice to move said nozzle towards a position in which its jet is in alignment with said edge.

9. In combination, means providing an orifice, means providing gas flow through said orifice, a baffle, means for effecting movement of said baffle relative to said orifice to control flow of gas therethrough, the last mentioned means comprising a nozzle, means providing gas to said nozzle to provide a jet producing by impact said baffle movement, and means providing an edge movable to intercept said jet to render it ineffective to produce said baffle movement, means responsive to the control by said baffle of flow through said orifice to move said nozzle towards a position in which its jet is in alignment with said edge, and indicating means responsive to the movement of said nozzle.

10. In combination, means providing an orifice, means providing gas flow through said orifice, a baffle, means for effecting movement of said baffle relative to said orifice to control flow of gas therethrough, the last mentioned means comprising a nozzle, means providing gas to said nozzle to provide a jet producing by impact said baffle movement, and means providing an edge movable to intercept said jet to render it ineffective to produce said baffle movement, means responsive to pressure before the orifice produced by the control by said baffle of flow through said orifice to move said nozzle towards a position in which its jet is in alignment with said edge, and indicating means responsive to the movement of said nozzle.

11. In combination, means providing a magnet positionable along the predetermined path in accordance with the value of a variable, a follower for said magnet, means mounting said follower for movement, means providing an orifice, means providing gas flow through said orifice, a baffle, means for effecting movement of said baffle relative to said orifice to control flow of gas therethrough, the last mentioned means comprising a nozzle, means providing gas to said nozzle to provide a jet producing by impact said baffle movement, a vane connected to said follower and providing a contoured edge movable to intercept said jet to render it ineffective to produce said baffle movement, and means responsive to the control by said baffle of flow through said orifice to move said nozzle towards a position in which its jet is in alignment with said edge.

12. In combination, means providing a magnet positionable along a predetermined path in accordance with the valve of a variable, a follower for said magnet, means mounting said follower for movement, means providing an orifice, means providing gas flow through said orifice, a baffle, means for effecting movement of said baffle relative to said orifice to control flow of gas therethrough, the last mentioned means comprising a nozzle, means providing gas to said nozzle to provide a jet producing by impact said baffle movement, a vane connected to said follower and providing a contoured edge movable to intercept said jet to render it ineffective to produce said baffle movement, means responsive to the control by said baffle of flow through said orifice to move said nozzle towards an position in which its jet is in alignment with said edge, and indicating means responsive to the movement of said nozzle.

13. In combination, means providing a magnet positionable along a predetermined path in accordance with the value of a variable, a follower for said magnet, means, mounting said follower for movement, means providing an orifice, means providing gas flow through said orifice, a baffle, means for effecting movement of said baffle relative to said orifice to control flow of gas therethrough, the last mentioned means comprising a nozzle, means providing gas to said nozzle to provide a jet producing by impact said baffle movement, a vane connected to said follower and providing a contoured edge movable to intercept said jet to render it ineffective to produce said baffle movement, and means responsive to pressure before the orifice produced by the control by said baffle of flow through said orifice to move said nozzle towards a position in which its jet is in alignment with said edge.

14. In combination, means providing a magnet positionable along a predetermined path in accordance with the value of a variable, a follower for said magnet, means mounting said follower for movement, means providing an orifice, means providing gas flow through said orifice, a baffle, means for effecting movement of said baffle relative to said orifice to control flow of gas therethrough, the last mentioned means comprising a nozzle, means providing gas to said nozzle to provide a jet producing by impact said baffle movement, a vane connected to said follower and providing a contoured edge movable to intercept said jet to render it ineffective to produce said baffle movement, means responsive to pressure before the orifice produced by the control by said baffle of flow through said orifice to move said nozzle towards a position in which its jet is in alignment with said edge, and indicating means responsive to the movement of said nozzle.

References Cited by the Examiner

UNITED STATES PATENTS

| | | | |
|---|---|---|---|
| 2,065,702 | 12/36 | Hubbard | 73—388 |
| 2,092,032 | 9/37 | Sperry et al. | 33—204.63 |
| 2,242,656 | 5/41 | Moore | 73—388 |
| 2,380,357 | 7/45 | Ziebolz | 33—23 |
| 2,419,942 | 5/57 | Brewer | 73—209 |
| 2,475,630 | 7/49 | Melas et al. | 73—209 |
| 2,617,300 | 11/52 | Kinderman | 73—215 |
| 2,816,457 | 12/57 | Sterzer | 74—569 |
| 2,829,540 | 4/58 | Niemeyer | 74—569 |
| 2,911,991 | 11/59 | Pearl | 73—388 |
| 2,944,558 | 7/60 | Dodge | 137—82 |
| 3,056,292 | 10/62 | Levins | 73—194 |
| 3,065,635 | 11/62 | Keller | 73—319 |

RICHARD C. QUEISSER, *Primary Examiner.*

ROBERT L. EVANS, *Examiner.*